United States Patent [19]

Mathews

[11] 4,091,820
[45] May 30, 1978

[54] APPARATUS FOR REMOVING BRUSSELS SPROUTS FROM THE PARENT STALKS

[76] Inventor: Raymond William Mathews, Rathrobin, Blueball, Tullamore, County Offaly, Ireland

[21] Appl. No.: 670,268

[22] Filed: Mar. 25, 1976

[30] Foreign Application Priority Data

Mar. 27, 1975 United Kingdom .............. 12986/75

[51] Int. Cl.² ...................... A23N 15/01; A65H 17/38
[52] U.S. Cl. .................................. 130/30 R; 99/639; 226/187
[58] Field of Search .................. 99/635, 636, 637–639, 99/642; 130/30 B, 30 R, 9 R–9 F, 9 B; 226/184, 187; 214/338–339

[56] References Cited

U.S. PATENT DOCUMENTS

| 464,764 | 12/1891 | Ritty ..................................... 130/9 D |
| 1,733,812 | 10/1929 | MacRae ................. 214/338 |
| 2,863,660 | 12/1958 | Delafontaine ......................... 226/187 |
| 3,175,561 | 3/1965 | Oldershaw .......................... 130/30 R |
| 3,212,506 | 10/1965 | Hagopian ............................ 130/30 R |
| 3,252,463 | 5/1966 | Alpen .................................. 130/30 R |
| 3,410,272 | 11/1968 | Van Den Hemel ............... 130/30 R |
| 3,552,397 | 1/1971 | Greenough ......................... 130/30 R |

*Primary Examiner*—Harvey C. Hornsby
*Assistant Examiner*—Robert Pous
*Attorney, Agent, or Firm*—James & Franklin

[57] ABSTRACT

An apparatus for removing brussels sprouts from the parent stalks including a plurality of blades arranged generally in the form of a truncated pyramid and defining an aperture for receiving the sprout bearing stalks, the blades being rotatable to remove brussels sprouts from the stalks, as the stalks are fed into the assembly through the aperture.

10 Claims, 8 Drawing Figures

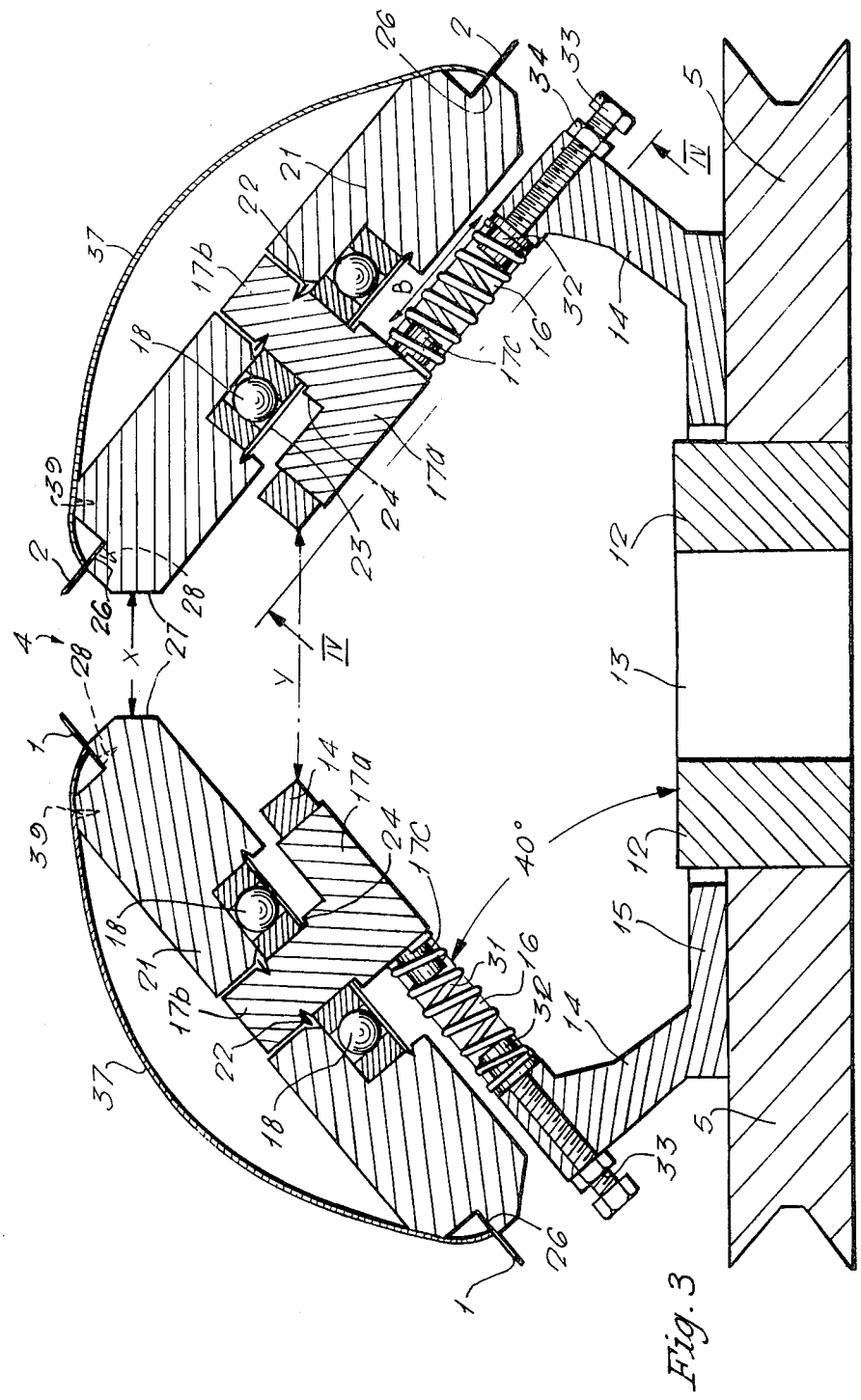

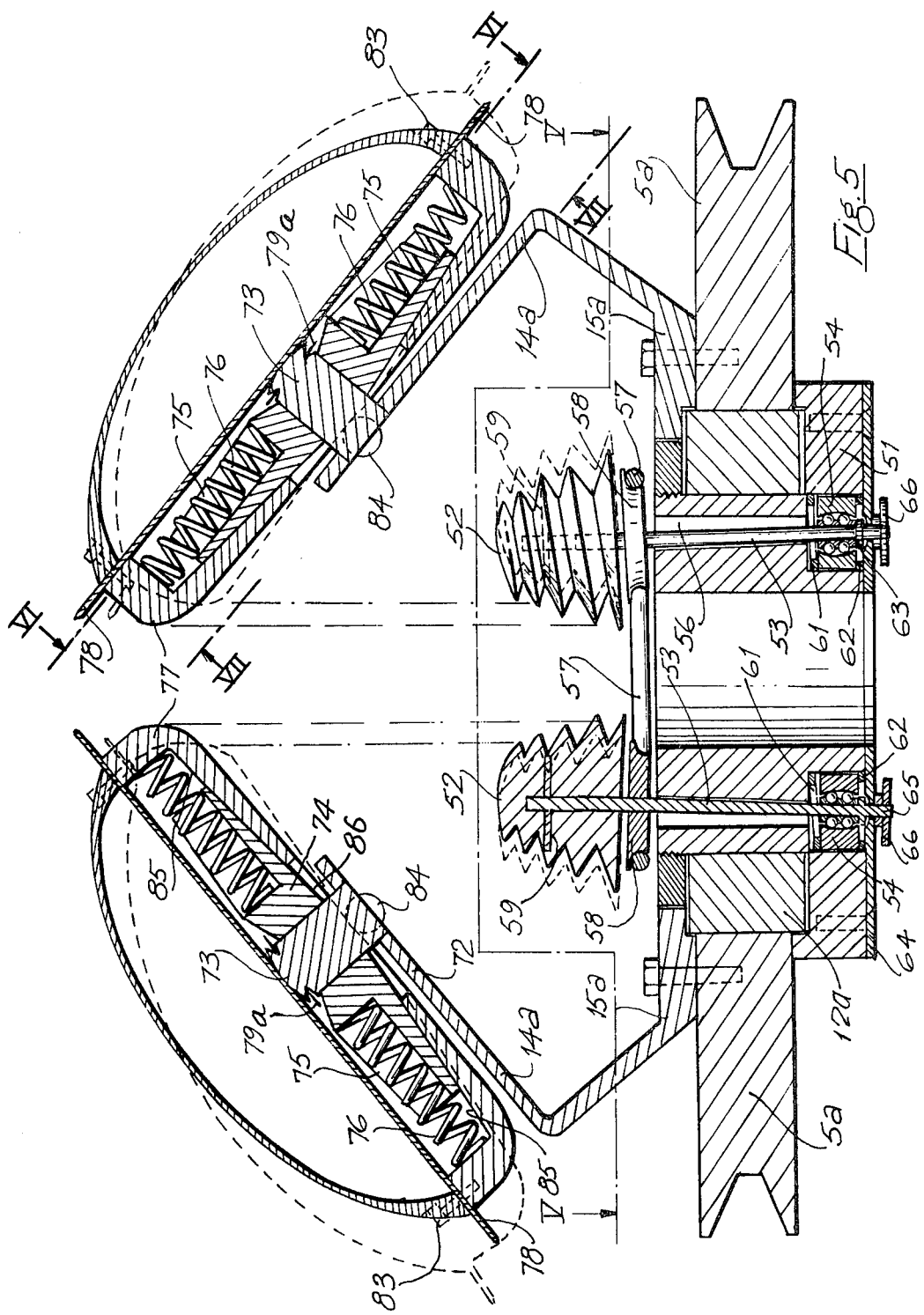

4,091,820

APPARATUS FOR REMOVING BRUSSELS SPROUTS FROM THE PARENT STALKS

The present invention relates to an apparatus for removing brussels sprouts from the stalks upon which the brussels sprouts grow. It is common practice to remove the sprouts from the stalks by hand, in the absence of a satisfactory apparatus for automatically removing the sprouts from the stalks.

According to the present invention, there is provided an apparatus for removing brussels sprouts from stalks, said apparatus comprising a rotatable blade assembly having an aperture through which stalks bearing brussels sprouts may be passed, a blade or blades mounted on said assembly and defining said aperture, so that as the stalks bearing the brussels sprouts are passed into said aperture and through the assembly, the sprouts are removed from the stalks by the blade or blades and are repelled by the assembly. The blade or blades may be arranged in the form of a truncated cone or pyramid, in the truncated apex of which is an aperture by means of which the stalks may be fed through the blade assembly, the brussels sprouts being removed from the stalks by the blade or blades as the stalks pass into the cone or pyramid through said aperture.

The invention also provides guide means for drawing and guiding the stalks through the apparatus, said guide means being adapted to receive the butt end of the stalk after passage of the stalk into the blade assembly and thereafter to draw the stalk into and through the apparatus.

Advantageously, the blade assembly supports a plurality of blades each in the form of a disc, the discs being arranged in truncated pyramidal form and defining an opening or aperture at the top of the pyramid by means of which the stalks may be fed through the blade assembly, the brussels sprouts being removed as the stalks are fed into the assembly. Preferably, there are three disc blades on the blade assembly, and in one position thereof, each blade overlaps the contiguous blade by a small angle of approximately 5°.

The blade assembly may advantageously be mounted for rotation by a pulley through which the stalks exit following passage of the stalks through the blade assembly.

Each of the disc blades may be detachably supported on one of three wheels, each of which is rotatable on one of three arms which may be mounted directly or indirectly on one side of the pulley so that the free ends of the arms are inclined towards a common point. The arms are advantageously mutually spaced apart by an angle of 120° and the free ends of the arms may be disposed at an angle of between 40° and 50° to the near side of the pulley.

The blades are advantageously provided with dome shaped covers which serve to repel from the blade assembly brussels sprouts which are removed from the stalks as the latter pass into the blade assembly.

The pulley itself may be mounted for rotation upon a ball race, through the bore of which the stalks pass from the blade assembly.

According to a particularly advantageous feature of the invention, the wheels are spring loaded so that the opening or aperture at the apex of the truncated pyramid is automatically increased when a stalk of a diameter greater than a predetermined minimum is fed into the blade assembly through said opening. The angle at which each of the disc blades is disposed may also change automatically in response to pressure from the stalks.

Advantageously, the stalk guide means comprises a series of roller wheels or rotatable cones with or without gripping surfaces, but in a preferred construction, the guide means includes four screw-threaded cones which are rotatable within the apparatus and behind the blade assembly and which define an aperture through which the stalk is drawn and guided by the cones as the stalk travels through the apparatus. The cones are spring loaded so that the aperture defined by the cones may be increased against spring pressure when the apparatus is handling a stalk having a diameter in excess of a predetermined minimum.

The invention will hereinafter be described more particularly with reference to the accompanying drawings which illustrate, by way of example only, a preferred embodiment thereof. In the drawings, FIG. 1 is a diagrammatic view showing a stalk, bearing brussels sprouts, being fed into the apparatus according to the invention.

FIG. 3 is a sectional elevation on lines III—III of FIG. 2, FIG. 5 is a sectional elevation corresponding to FIG. 3, but showing a modified construction.

Figure 2:
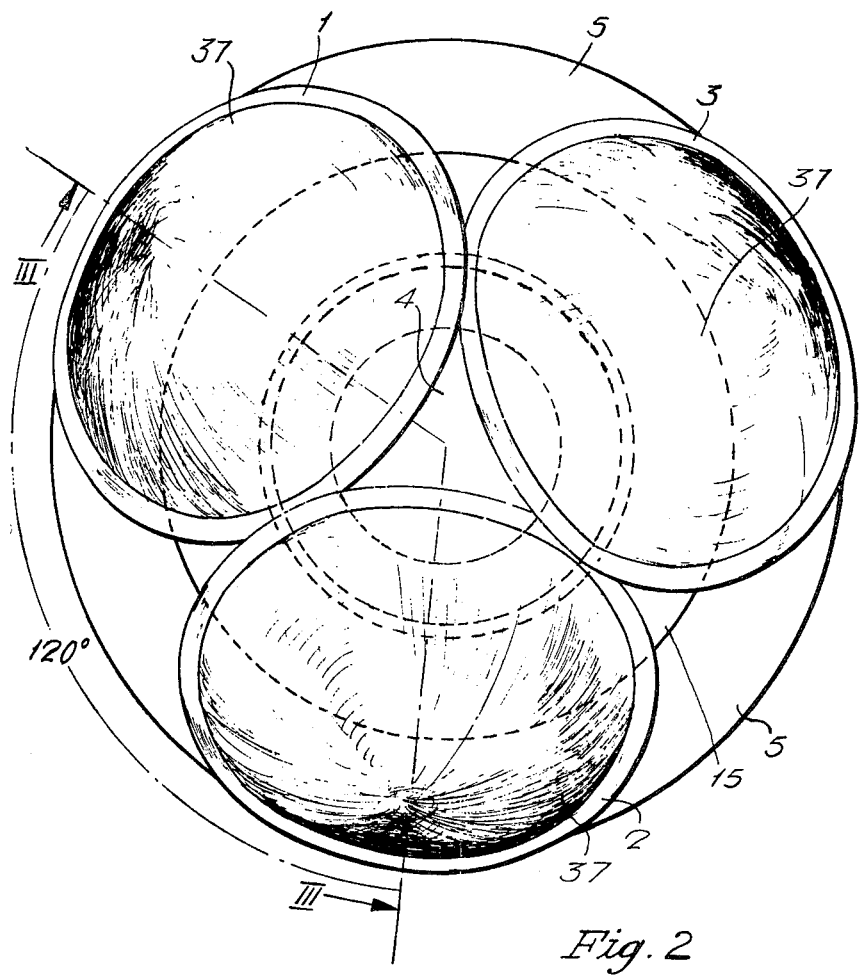
FIG. 2 is a front view of the apparatus, looking in the direction of arrow C of FIG. 1.

Referring initially to the embodiment described with reference to FIGS. 1 to 4 inclusive of the drawings, the apparatus comprises a blade assembly including disc blades 1, 2 and 3 mounted so as to define a truncated pyramid in which there is provided an aperture 4 (see particularly FIG. 2).

The blades 1, 2 and 3 are rotatable upon rotation of a belt driven pulley 5. Welded to one side of the pulley 5 is a disc shaped support 15 for three arms 14 integral with and mutually spaced on the support 15 by an angle of 120° (see FIG. 2). The arms 14 each make an angle of 40° with the side of the pulley 5 (see FIG. 3).

Figure 4:
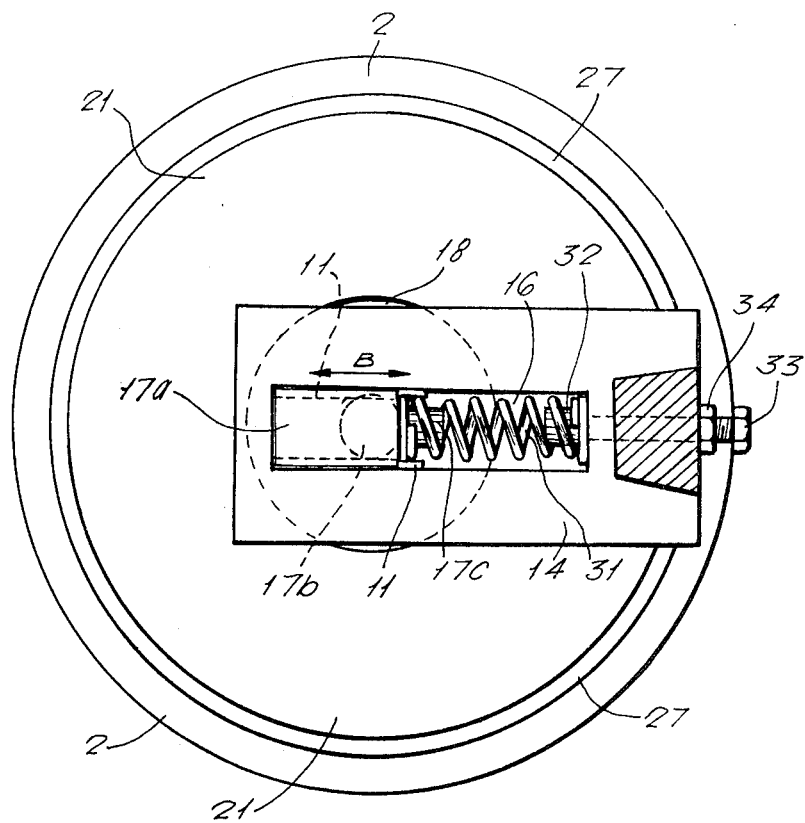
FIG. 4 is an elevation, on lines IV—IV of FIG. 3.

As shown in FIG. 4, each of the arms 14 is essentially in the form of a rectangular plate which has a chamber 16 on a portion of each side of which are guide elements 11 for a spring loaded rectangular spud 17a. The guide elements 11 project into grooves of each side of the spud 17a and enable the latter to move along arrow B under the action of a spring 31 located between a spring support 17c on the spud 17a and a spring compressor element 32. The tension in the spring 31 may be varied by movement of spring compressor element 32 in response to rotation of a tension screw 33 mounted in the arm 14. The tension screw 33 has a lock nut 34.

Each spud 17a is integral with a cylindrical spindle 17b which supports a ball race 18 on which is rotatable a wheel 21. A clip 22 which fits into a groove in the spindle 17b holds the ball race 18 against a landing 24 on the spindle 17b and a clip 23 which fits into a groove in the wheel 21 releasably secures the wheel 21 onto the ball race 18.

Portion of the peripheries of the wheels 21 are cut away to provide seats 26 for the disc blade 1, 2 and 3 which project beyond the seats 26. The disc blades 1, 2 and 3 are releasably secured on the seats 26 by screws 28 which pass into threaded holes in the wheels 21. The disc blades 1, 2 and 3 are thus readily replaceable.

A light steel domed cover 37 is releasably secured to each of the wheels 21 by screws 39 which pass into threaded holes in the wheel 21.

Figure 1:
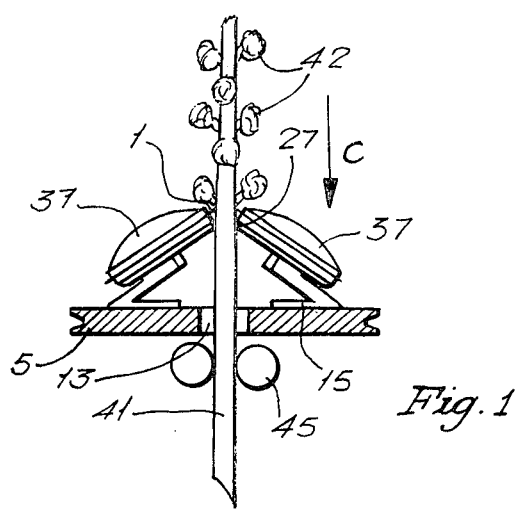

In operation, the pulley 5 is rotated on ball race 12 and stalks bearing brussels sprouts 42 are fed singly into the apparatus in the direction of arrow C (see FIG. 1). The sprouts 42 are removed by the action of the rotating blades 1, 2 and 3 as the stalks 41 are fed into the assembly through aperture 4 and through bore 13 in the ball race 12.

The disposition of the disc blades 1, 2 and 3 is self-adjusting to accommodate stalks of a diameter greater than a predetermined minimum. For example, the forward end of each stalk is cut at an angle so as to facilitate entry of the stalk into the assembly through aperture 4. If the diameter of the stalk is above the predetermined minimum, the bevelled edges 27 (see FIG. 3) of the wheels 21 will ride on the stalks and the wheels 21 will be mutually separated and pressed away from the stalk against the action of the springs 16.

The removed brussels sprouts are repelled from the assembly by the rotating domed covers 37 and may be deposited in a sprout collection receptacle (not shown). If desired, guide means (not shown) may be provided to guide the repelled sprouts into the sprout collection receptacle.

The stalks 41 from which the brussels sprouts are being removed may be drawn through the blade assembly and bore 13 by rollers 45 (see FIG. 1) geared to the pulley 5 and the rollers 45 may also guide the stalks into a stalk collection receptacle (not shown).

In a particular construction according to the invention, the distance between the bevelled edges 27 may be set at one inch (see arrow X of FIG. 3) the distance between arms 14 being two inches (see arrow Y of FIG. 3).

Figure 5A:
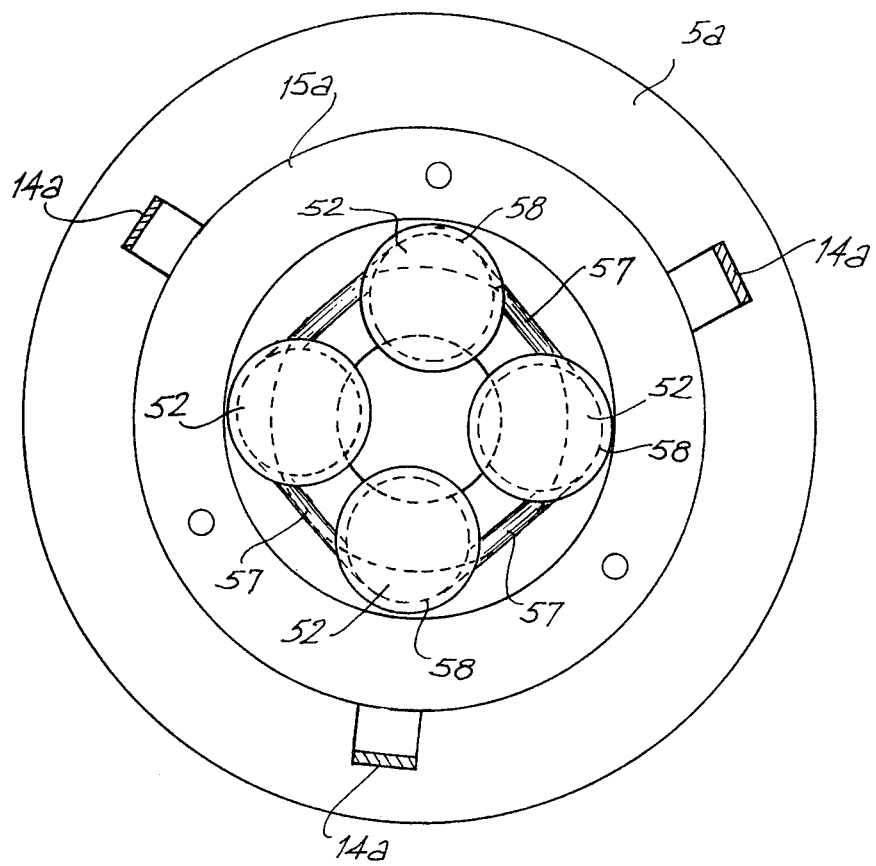
FIG. 5a is a plan view generally on lines V—V of FIG. 5.

As shown particularly in FIG. 5, but indicated in plan view as part of FIG. 5a, the stalk guide means includes four screw-threaded cones 52, each of which is located upon a separate spindle 53 mounted for rotation in a central block 51, on which the ball race 12a is mounted. Each spindle 53 is supported at one end thereof in a self aligning bearing 54 positioned in a recess in the central block 51, and at the other end by a free bearing 58 upon which a continuous spring 57 acts, the arrangement being such that the spindle 53 may tilt in the bore 56 of the central block 51. The diameter of the bore 56 expands along its length and is wider at one end thereof, namely at the end at which the cone 52 is located, so as to allow for greater tilting movement of the spindle at that end than at the other end thereof, under the action of the continuous spring 57. Each cone 52 is held on the associated spindle 53 by a roll pin 59.

A pair of rings 61 and 62 position the self aligning bearing 54 in the recess, allowing tilting movement of the bearing 54 and associated spindle 53. A cover plate 64 holds the ring 62 in position in the recess. Each spindle 53 has an abutment 63 which prevents axial movement of the spindle 52 in a direction towards the blade assembly. Axial movement of the spindle 52 in the other direction would be prevented by contact of the cone 52 which is fixed upon the spindle 53 against free bearing 58 and the central block 51. The end 65 of each spindle 53 projects beyond the central block 51 and supports a sprocket wheel 66 for rotating the spindles 53 and cones 52.

The four sprocket wheels 66 may advantageously be rotated by a continuous chain (not shown) arranged so as to cause two opposite cones to rotate in a clockwise direction, and the other two opposite cones to rotate in an anticlockwise direction. With this object in mind, the screw threads on the cones are, alternately, left and right hand screw threads.

It will be appreciated that the apparatus may be mounted on a combine harvester for use in the field. Alternatively, the apparatus may be operable independently, and may be fed automatically or manually.

Advantageously, the blade assembly shown in the accompanying drawings may be rotated at a speed of approximately 700 revolutions per minute.

Figure 7:
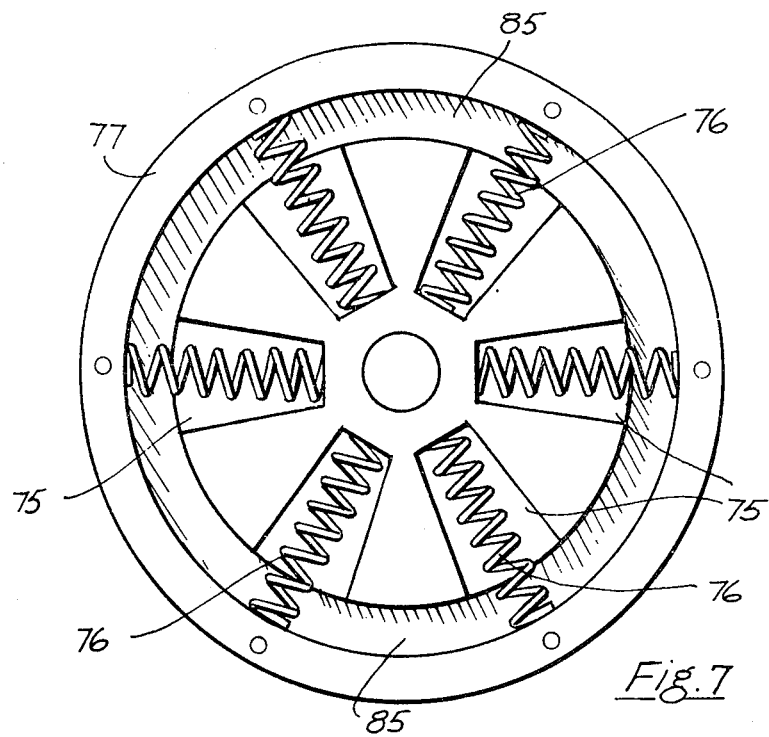
FIG. 7 is an elevation, generally on lines VII—VII of FIG. 5.
Figure 6:
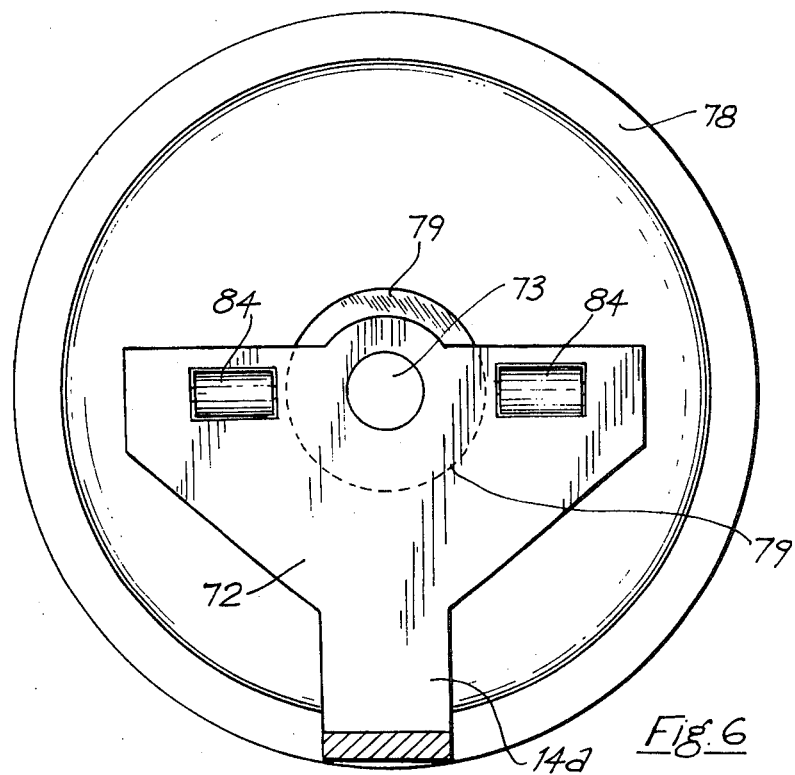
FIG. 6 is an elevation, generally on lines VI—VI of FIG. 5.

FIGS. 5, 6 and 7 show an alternative arrangement for supporting the disc blades. In the alternative arrangement, as in the construction shown in FIG. 3, the pulley 5a has welded to one side thereof a disc shaped support 15a for three arms 14a integral with and mutually spaced at 120° on the support 15a.

As shown in FIG. 6, each of the arms 14a is also in the form of a plate 72 on which is an integral fixed spud 73. Rotatable on the fixed spud 73 is a wheel-shaped base element 74 in which recesses 75 accommodate compression springs 76 which act between the base element 74 and the interior of a wheel shaped disc blade support 77 which has a bore 79 substantially greater than the diameter of the spud 73. The disc blade support 77 is co-axial with the base element 74, and is movable relative to the base element 74, against the pressure of the springs 76. A circular clip 79a holds the base element 74 onto the fixed spud 73.

A disc blade 78 serves as a cover for the base element 74, and, when secured onto the base element 74, holds the springs 76 in the positions shown.

Screws 83 secure a light steel dome cover 82 to the disc blade support 77, the screws 83 also passing through apertures in, and releasably fixing, the disc blade 78 in position on the disc blade support 77.

Each plate 72 supports a pair of rollers 84 upon which the disc blade support 77 is movable under the pressure which acts against the springs 76.

It will be noted that the floor surface 85 of the interior of the disc blade base support 77 is inclined and that the underside surface 86 of the base element 74 is also inclined. The inclined floor portion 85 and the underside 86 co-operate, when pressure is applied to the disc blade support 77 to alter the angle of inclination of the disc blade 78, relative to the centre of the path of movement of a brussels sprout stalk through the blade assembly.

Thus, in the configuration shown with reference to FIGS. 5 and 5a, the disc blades 78 normally make an angle of say 40° with the plane defined by the nearside of the pulley 5a.

When the butt end of a brussels sprout stalk, which has a diameter above a predetermined minimum, is fed into the assembly, and presses outwardly the disc blade supports 77, the latter move against the pressure of the springs 76 and tilt as a result of contact between the inclined surfaces 85 and 86, thus not only altering the disposition of the disc blades 78, but also increasing the angle of inclination of the blades 78.

Generally speaking, the acute angle which a brussels sprout makes with its parent stalk increases from the butt end toward the narrow end of the stalk. As a stalk is passing through the apparatus, the angle of inclination of the disc blades 78 increases as the diameter of the stalk decreases so that the blades are self-adjusting both as regards the disposition of the blades, and also as regards the angle of inclination of the blades.

I claim:

1. Apparatus for removing Brussels sprouts from a stalk, said apparatus comprising a rotatable blade assembly defining an aperture for receiving a stalk bearing Brussels sprouts, said assembly including at least three disc blades arranged generally in truncated pyramidal form to define said aperture, a blade support for each of said blades, each of said blade supports being independently and freely rotatable upon an axis which is displaceable relative to the axis of rotation of said assembly so that said aperture defined by said blades may change in response to pressure exerted on said blade supports by a stalk passing through said aperture.

2. Apparatus as claimed in claim 1 wherein each of said blade supports is independently and freely rotatable upon an axis which is displaceable laterally and angularly relative to the axis of rotation of said assembly.

3. Apparatus for removing Brussels sprouts from a stalk, said apparatus comprising a rotatable blade assembly defining an aperture for receiving a stalk bearing Brussels sprouts, said assembly including at least three disc blades arranged generally in truncated pyramidal form to define said aperture and a substantially wheel shaped blade support for each of said blades; each said wheel shaped support including a generally dish shaped support element having an internal annular inclined surface and a wheel shaped spring loaded element located within said dish shaped support element, said spring loaded element also having an annular inclined surface against which surface said inclined surface of said dish shaped support element is slidable, compression springs acting between said dish shaped support element and said spring loaded element normally maintaining said two support elements in co-axial disposition, but allowing said dish shaped support element limited axial movement relative to said spring loaded element upon pressure being applied to said dish shaped support element by a stalk passing through said apparatus, said limited and relative axial movement of said two support elements on said inclined surfaces also causing a variation in the angle of inclination of said blade carried on said dish shaped support element.

4. Apparatus as claimed in claim 2, including a substantially wheel shaped support for each of said blades, a base element for supporting each of said wheel shaped supports, spring means operatively connected between each of said wheel shaped supports and base elements and enabling said wheel shaped supports to be resiliently displaced axially and angularly under pressure exerted upon said wheel shaped supports against said spring means by a stalk passing through said apparatus, so that said aperture defined by said blades, and the angles of inclination of said blades, may change automatically in response to pressure exerted by the stalk.

5. Apparatus for removing Brussels sprouts from a stalk, said apparatus comprising a rotatable blade assembly defining an aperture for receiving a stalk bearing Brussels sprouts, said assembly including at least three disc blades arranged generally in truncated pyramidal form to define said aperture, a blade support for each of said blades, said blade supports being resiliently mounted so that said aperture defined by said blades may change in response to pressure exerted on said blade supports by a stalk passing through said aperture, said apparatus including a pulley mounted for rotation on a ball race, means for drawing the stalks through the bore of the ball race to exit from the blade assembly, the pulley having three arms spaced apart by an angle of 120°, each arm providing on the free end thereof one of said blade supports for one of said disc blades, each of said blade supports being independently and freely rotatable.

6. Apparatus as claimed in claim 5, further comprising a dome shaped cover, for each of said blades, for repelling from the blade assembly brussels sprouts removed from stalks passing into the rotating blade assembly.

7. Apparatus as claimed in claim 6, further comprising guide means for receiving the butt end of each stalk after passage of the stalk into the blade assembly and for drawing each stalk through the apparatus.

8. Apparatus as claimed in claim 7, said guide means including four screw-threaded cones rotatable within the apparatus and behind the blade assembly and defining an aperture for receiving the stalk to be guided by the cones as the stalk travels through the apparatus, said cones being resiliently mounted so that said aperture may increase under pressure from the stalk when the apparatus is handling a stalk having a diameter in excess of a predetermined minimum.

9. Apparatus as claimed in claim 8, including a spindle for supporting each of the threaded cones, each of the spindles being supported at one end thereof in a self aligning bearing and at the other end by a free bearing, a continuous spring acting on said free bearings enabling the spindles to tilt against the action of the continuous spring.

10. Apparatus as claimed in claim 9, including means for rotating the spindles so as to cause two opposite cones to rotate in a clockwise direction, and the other two opposite cones to rotate in an anticlockwise direction, the cones having, alternately, left and right hand screw threads.

* * * * *